United States Patent [19]
Lee

[11] Patent Number: 5,570,253
[45] Date of Patent: Oct. 29, 1996

[54] SELECTION LEVER SLIDING MEANS FOR DISENGAGING THE SELECTION GEAR FROM THE MAIN GEAR OF A CASSETTE TAPE RECORDER WHEN SELECTING A MODE

[75] Inventor: Taek S. Lee, Seoul, Rep. of Korea

[73] Assignee: Goldstar Co., Ltd., Seoul, Rep. of Korea

[21] Appl. No.: 342,035

[22] Filed: Nov. 17, 1994

[51] Int. Cl.$^6$ ............................ G11B 15/48; G11B 5/008; G11B 15/00; G11B 17/00
[52] U.S. Cl. ........................... 360/137; 360/74.1; 360/96.3
[58] Field of Search ..................................... 360/137, 105, 360/74.1, 96.3; 242/356.3, 356.7

[56] References Cited

U.S. PATENT DOCUMENTS

| | | | |
|---|---|---|---|
| 4,399,475 | 8/1983 | Shimomae | 360/96.3 |
| 5,260,844 | 11/1993 | Koga et al. | 360/96.3 |
| 5,377,061 | 12/1994 | Yoshimura | 360/105 |
| 5,392,182 | 2/1995 | Lee et al. | 360/137 |

Primary Examiner—Stuart S. Levy
Assistant Examiner—Adriana Giordana
Attorney, Agent, or Firm—Fish & Richardson PC

[57] ABSTRACT

The invention relates to a device for changing modes of a cassette tape recorder, which facilitates reduction of power consumption as well as reduction of noise. A selection gear, hinged on a selection lever, is disengaged from the main gear during which play, record, reverse play, or reverse record mode is selected, during which the selection gear has been engaged with the main gear in stop condition. This prevents movement of the selection lever, unnecessary rotation of the selection gear, and accordingly, prevents the motor driving the main gear from being overloaded.

The device for changing over of modes of a cassette tape recorder includes a transmission lever fixed on a pinch gear shaft for being primarily rotated by a solenoid lever and for being secondarily rotated by a cam gear when play, record, reverse play, and reverse record mode is selected. A selection lever is movably fixed on the same shaft with a main gear, and is movable in an up and down direction. The selection lever is moved downward to disengage the selection.

6 Claims, 9 Drawing Sheets

SELECTION LEVER SLIDING MEANS FOR DISENGAGING THE SELECTION GEAR FROM THE MAIN GEAR OF A CASSETTE TAPE RECORDER WHEN SELECTING A MODE

FIELD OF THE INVENTION

This invention relates to a device for changing over of modes of a cassette tape recorder, and more particularly to a device for changing over of modes of a cassette tape recorder, which can reduce power consumption by disengaging a selection gear from a main gear on selection of play, record, reverse play, or reverse record mode.

BACKGROUND OF THE INVENTION

In general, a cassette tape recorder is an appliance for recording external sound on a tape or reproducing sound recorded on a tape, which has a mode change over device for a user to record external sound on 'A' side or on 'B' side at the selection of the user as well as to reproduce sound recorded on 'A' side or on 'B' side at the selection of the user.

As shown in FIG. 1, a conventional mode change over device generally includes a main gear 2 hinged on a main plate 1 for being rotated by the driving force received from a motor (not shown). A pinch gear 3 is hinged on the main plate 1 for being rotated by the driving force received from the main gear 2. A cam gear 4 is hinged on the main plate 1 for being selectively rotated by the driving force received from the pinch gear 3. A solenoid lever 7 is mounted on the main plate 1 with a spring 5 which causes initial engagement of the pinch gear 3 with the cam gear 4. This allows the rotating force of the pinch gear 3 to be transmitted to the cam gear 4 while the solenoid lever 7 is turned along with the movement of the solenoid 6 at change over of a mode. An actuation lever 9 is hinged on the main plate 1 and connected to a first torsion spring 8 for being selectively turned along with the rotation of the cam gear 4. A function plate 10 is movably mounted on the main plate 1 for actuating mode change over switches (not shown) to enable modes of stop, play, record, reverse play, and reverse record while moving in the right and left direction following the turn of the actuation lever 9. A clutch (not shown) is disposed on the shaft of the main gear 2 for transmitting or cutting power upon receipt of the rotating force of the actuation lever 9. A rotation lever 11 is hinged on the main plate 1 and is turned by the driving force received from the solenoid lever 7. A selector (not shown) is disposed on the shaft of the main gear 2 for selective transmission of power to enable FF/REW modes upon receipt of the rotating force of the rotation lever 11. A regulator (not shown) is disposed on the shaft of the pinch gear 3 for regulating the selector upon receipt of the rotating force of the cam gear 4 during selection of modes of play, record, reverse play, and reverse record, and releasing the regulation of the selector on selection of FF/REW modes. And, a power transmitter disposed on the main plate 1 for selective transmission of power to enable driving of a tape upon receipt of rotational force of the main gear 2 through the clutch means and the selection means on selection of modes of play, record, reverse play, reverse record, and FF/REW.

The cam gear 4 includes a upper cam 12 positioned at an upper side thereof, and an inner low cam 13 and an outer low cam 14 each positioned at low side thereof. The upper cam has a first catch projection 12a, a second catch projection 12b, and a third catch projection 12c. The outer low cam 14 has a fist step projection 14a, a second step projection 14b and a third step projection 14c, at one side thereof.

The solenoid lever 7 has a first upper projection pin 7a for selective catch of the first, the second, and the third catch projections 12a, 12b, and 12c of the upper cam 12 upon rotation of the cam gear 4 as well as a first low projection pin 7b for turning the rotation lever 11 upon a turn of the solenoid lever 7. The actuation lever 9 has a second projection pin 9a for engaging the inner low cam 13 of the cam gear 4 as well as a upper recess 9b and a low recess 9c at the upper and low ends thereof. The function plate 10 has a third projection pin 10a for being inserted into the upper recess 9b in the actuation lever 9 at one side of the upper surface thereof.

The clutch has a driving gear 15 integral with the main gear 2 on the under side thereof for being rotated together with the main gear 2. A clutch lever 16 is hinged on the shaft of the main gear 2 for being turned upon receipt of rotating force of the actuation lever 9. And, a movable gear 17 is hinged on the clutch lever 16 at the low end thereof for transmitting power to the power transmitter only upon selection of modes of play, record, reverse play, and reverse record while being rotated by the rotating force of the driving gear 15. The clutch lever 16 has a fourth projection pin 16a at the upper end thereof for inserting into the low recess 9c at the low end of the actuation lever 9, so that, when the actuation lever 9 is turned, the clutch lever 16 is also turned.

The selector has a selection lever 18 hinged on the shaft of the main gear 2 which has a catch piece 18a at the upper end thereof and a projection piece 18b at one side thereof. A selection gear 19 is disposed on the selection lever at the lower end thereof for selective transmission of power to the power transmitter only upon selection of FF/REW modes while being rotated by rotating force of the main gear 2.

The regulator has a regulation lever 21 disposed on the shaft of the pinch gear 3 and engaged with a second torsion spring 20. A contact projection 21a is integral with the regulation lever for turning the regulation lever 21 as it makes contact with the first, the second and the third step projections 14a, 14b, and 14c of the outer low cam 14 formed at under side of the cam gear 4 in sequence on selection of modes of play, record, reverse play and reverse record. And, a catch projection 21b is formed at outer periphery of the regulation lever 21 for catching the selection lever 18 as it is caught by the catch piece 18a formed at the selection lever 18 upon rotation of the regulation lever.

The power transmitter has a first intermediate gear 22 and a second intermediate gear 22a both disposed on the main plate 1 for being rotated at selective reception of rotational force of the selection gear 19 on selection of FF/REW modes. A follower gear 23 is disposed on the main plate 1 for rotating the first intermediate gear 22 by receiving rotation force of the movable gear 17 upon selection of modes of play, record, reverse play and reverse record. A first reel gear 24 is disposed on the main plate 1 for rotating a tape in normal direction while being rotated by the rotating force of the first intermediate gear 22. A second reel gear 24a is also disposed on the main plate 1 for rotating the tape in reverse direction while being rotated by the rotating force of the second intermediate gear 22a.

A device having the foregoing system can change over to a selected mode upon selection of modes play, record, reverse play and reverse record while in a stop condition because of the rotation of the main gear 2 (which also makes the pinch gear 3 rotate). The solenoid 6, which is also actuated, engages with the pinch gear 3 which makes the cam gear 4 rotate. Accordingly, because the solenoid lever 7 turns along the cam path of the upper cam 12 and the actuation lever 9 turns along the cam path of the inner low cam 13, the mode change over switches are actuated.

Operation upon selection of FF/REW modes now explained.

Figure 1A:
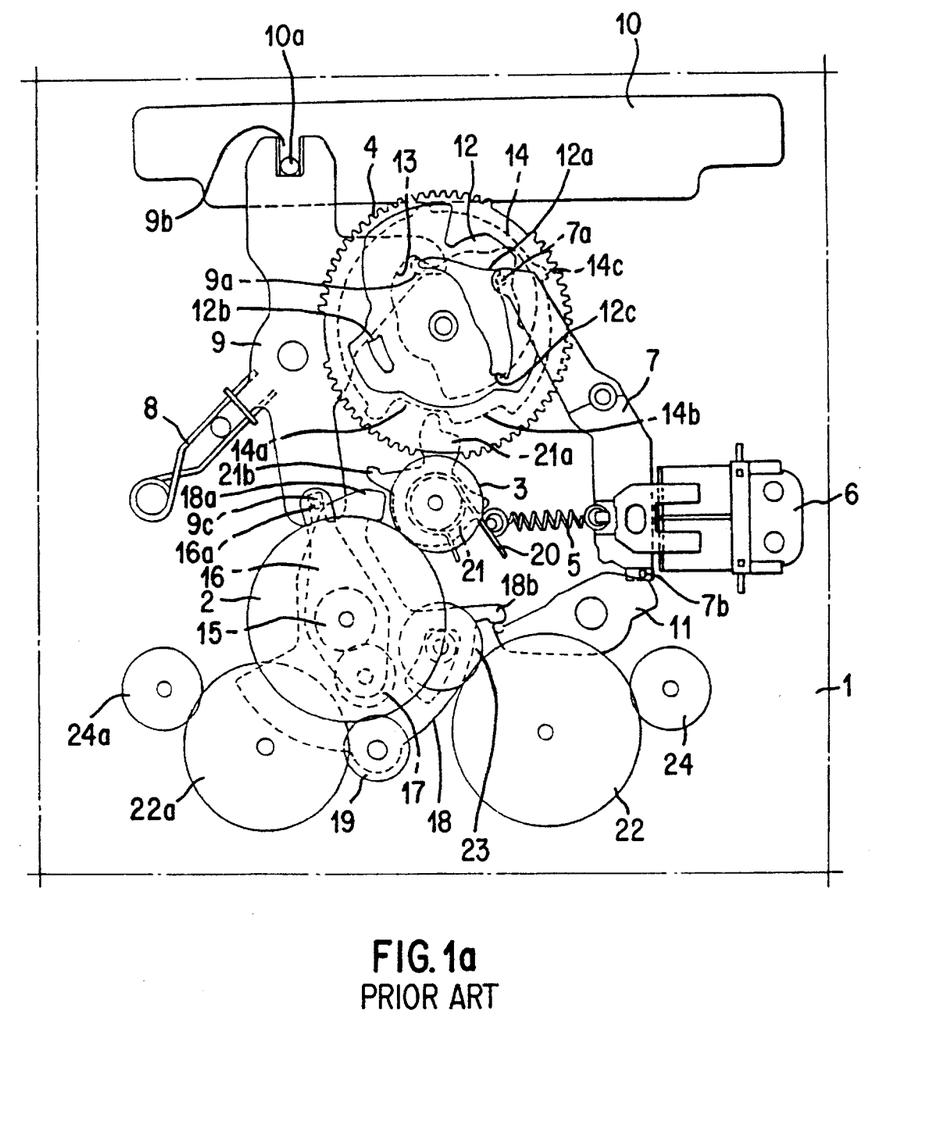
FIG. 1a shows a stop condition in which selection of FF/REW modes are available.

Upon selection of FF mode, the main gear 2 and the driving gear 15 rotate in counter clockwise direction facing the paper upon receipt of rotating force of the motor (not shown). This causes the selection gear 19, hinged at low end of the selection lever 18 and engaged to the main gear 2, to engage the first intermediate gear 22 to rotate the first reel gear 24 in clockwise direction, reeling a tape in normal direction at high speed.

REW mode selection works opposite FF mode selection. After the main gear 2 and the driving gear 15 are rotated, the selection lever 18 turns in clockwise direction about a shaft to cause the selection gear 19 to engage the second intermediate gear 22a and rotate the second reel gear 24a in counter clockwise direction, according to which the tape is reeled in reverse direction at high speed.

The clutch lever 16 also receives rotational force during selection of FF/REW modes, due to the direction of rotation of the main gear 2 and the driving gear 15. However, because the cam gear does not rotate, and the actuation lever 9 which has the low recess 9c formed at the low end of the actuation lever 9 inserted in the fourth projection pin 16a formed at the upper end of the clutch lever 16 remains stationary, the clutch lever 16 can not rotate.

Next, operation in cases when a user selects modes of play, record, reverse play, and reverse record in stop condition shown in FIG. 1(a) when FF/REW mode is only available is to be explained hereinafter.

First, if play or record is selected, the main gear 2 and the driving gear 15 are rotated in clockwise direction, rotating the pinch gear 3 engaged with the main gear 2 in counter clockwise direction. Then, when the solenoid 6 (mounted on the main plate 1) loses magnetic force, the spring 5 pulls the solenoid lever 7, turning the solenoid lever 7 in clockwise direction.

Figure 1B:
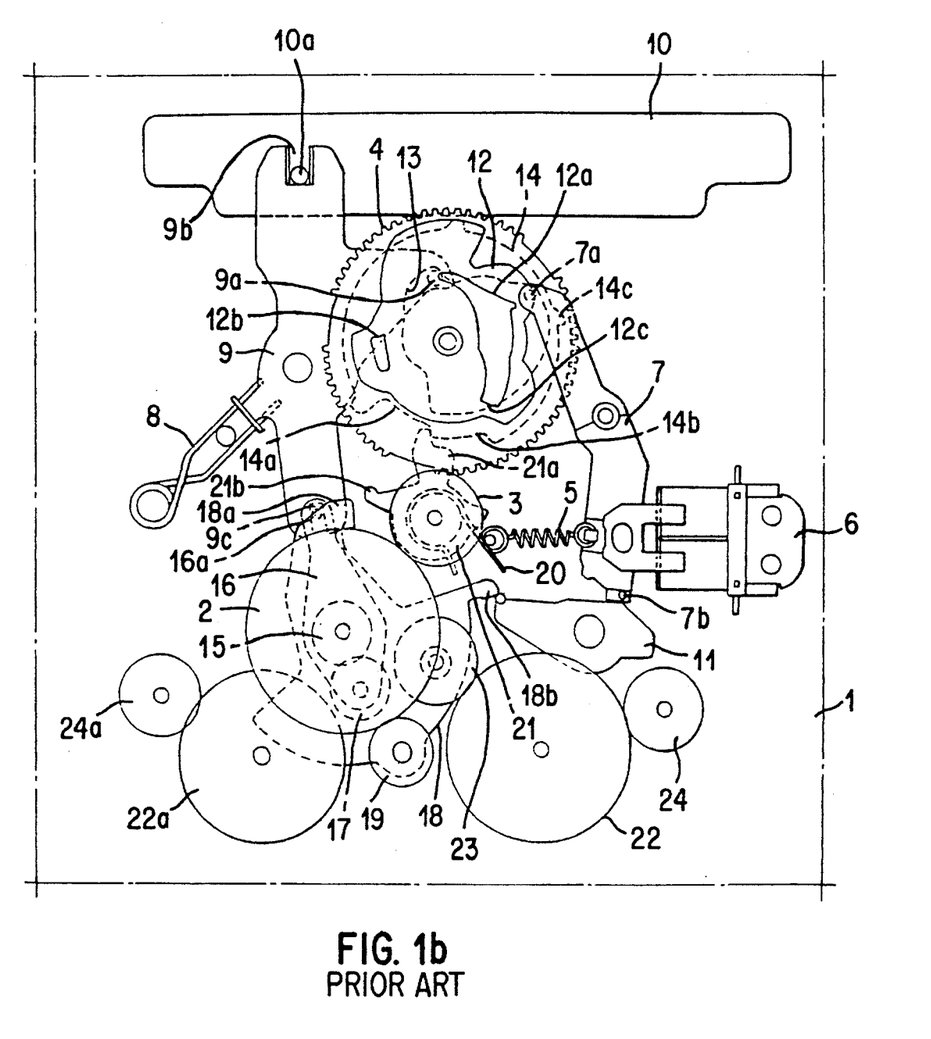
FIG. 1b shows an initial engagement condition of a cam gear with a pinch gear where play, record, reverse play, or reverse record mode has been selected.

The first upper projection pin 7a, released from the first catch projection 12a pushes on the causing slope the cam gear 4 to rotate about the shaft in clockwise direction facing the paper and engage the pinch gear 3. The cam gear 4 receives the rotating force of the pinch gear continuously, rotates in a clockwise direction, and makes the first projection piece 7b, at the low end of the solenoid lever 7, push one end of the rotation lever 11 hinged on the main plate 1, thus causing it to rotate in a clockwise direction.

This is shown in FIG. 1(b).

Then, as the cam gear 4 continues to turn, the contact projection 21a (formed on the regulation lever 21) makes contact with the first, second, and third step projections 14a, 14b, and 14c of the outer low cam 14 (formed on the under side of the cam gear 4). The regulation lever 21 receives force from the second torsion spring 20 and turns in counter clockwise direction facing the paper about a shaft. Since the solenoid lever 7, turning further in a clockwise direction due to the cam path in the upper cam 12 (formed on the upper side of the cam gear 4), continues to turn the rotation lever 11 in clockwise direction, the other end of the rotation lever 11 in clockwise direction, the other end of the rotation lever 11 pushes the projection piece 18b (formed at one side of the selection lever 18) upward, turning the selection lever 18 in the counter clockwise direction. The regulation lever 21 turns in counter clockwise direction after the selection lever 18 has been turned, and the catch projection 21b (formed on the regulation lever 21) moves until caught by the catch piece 18a (formed at the upper end of the selection lever 18) without being interfered by the catch piece 18a.

Figure 1C:
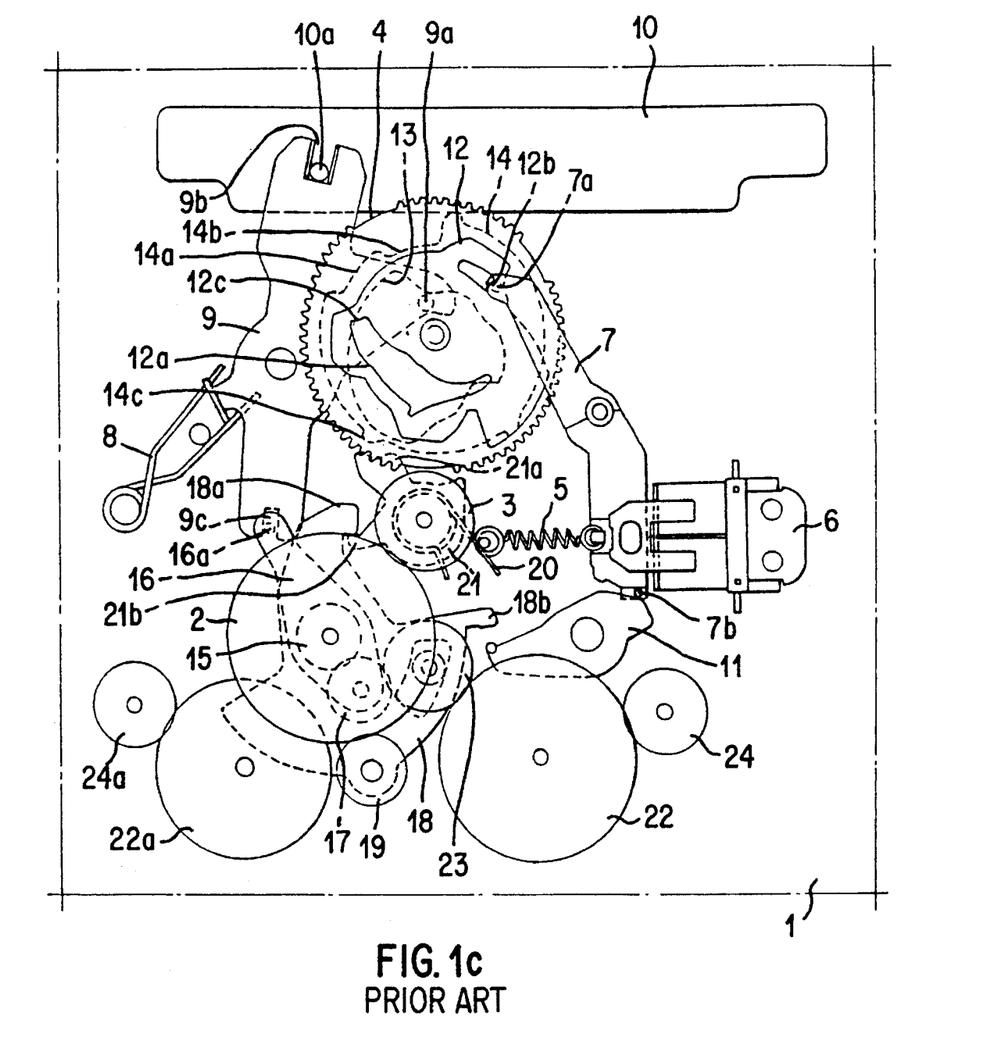
FIG. 1c shows a condition where play or record mode has been selected.

The actuation lever 9 (disposed on the main plate 1 and attached to the first torsion spring 8) rotates the clutch lever 16 in counter clockwise direction (while the actuation lever is turned in clockwise direction facing the paper). The second projection piece 9a (formed at one side of the actuation lever 9) is guided in the cam path of the inner low cam 13 following the rotation of the cam gear 4 in clockwise direction. This causes the movable gear 17, hinged on the low end of the clutch lever and engaged with the driving gear 15, to be engaged with the follower gear 23. Thus, when the function plate 10 (having the third projection piece 10a inserted in the upper recess 9b formed at upper side of the actuation lever 9) is moved to the right facing the paper in horizontal direction, a mode change is actuated to make play or record modes available.

Such condition is shown in FIG. 1(c), in which the solenoid lever 7 is caught by the first upper projection pin 7a at the second catch projection 12b of the upper cam 12.

Therefore, the rotational force of the driving gear 15, rotating in clockwise direction together with the main gear 2, is transmitted through the movable gear 17, the follower gear 23, the first intermediate gear 22, and the first reel gear 24 to the reel (not shown). This causes the reel to be rotated in clockwise direction and rotate a tape in normal direction, and play or record is made available according to a selected mode.

At the time of mode change over to play or record condition, as has been explained, even though the selection lever 18 also receives a force tending to turn the selection lever in clockwise direction due to the direction of rotation of the main gear 2 and the driving gear 15, the selection lever 18 can not be rotated due to regulation of the regulation lever 21.

Figure 1D:
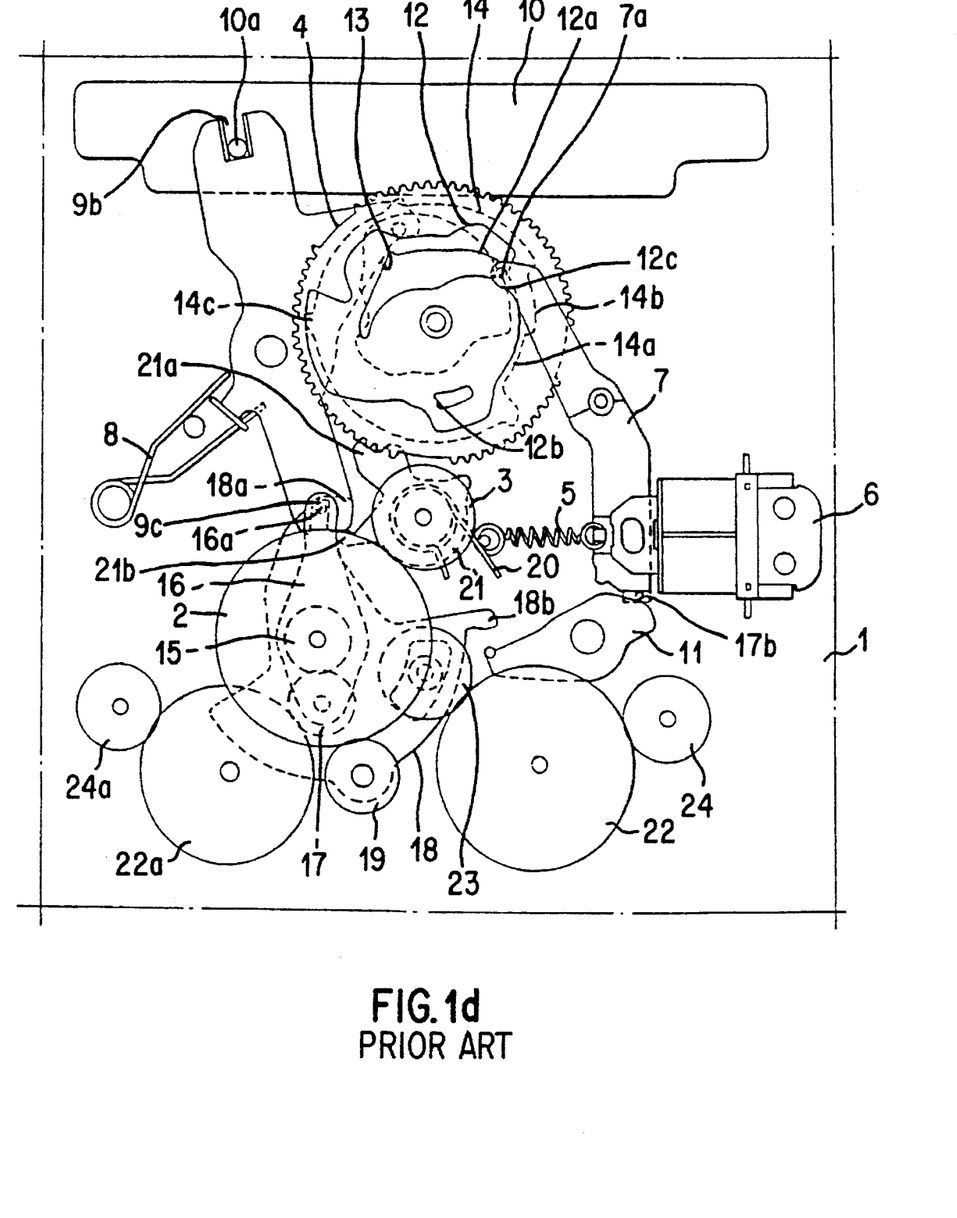
FIG. 1d shows a condition where reverse play or reverse record mode has been selected.

Selection of reverse play mode or reverse record mode is now explained.

Moving the function plate 10 to the right facing the paper in horizontal direction causes the actuation lever 9 to be turned in counter clockwise direction and follow the cam path on the inner low cam 13 (formed under side of the cam gear 4). This actuates the mode change over so that reverse play and reverse record are available. The clutch lever 16, rotates in a clockwise direction and causes the moving gear 17 (hinged on the low end of the clutch lever and engaged with the driving gear 15) to also engage the second intermediate gear 22a. The rotational force of the driving gear 15 is thus transmitted through the movable gear 17, the second intermediate gear 22a, and the second reel gear 24a to the reel. This causes the reel to rotate in a counter clockwise direction, and allows selection of reverse play or reverse record according to a selected mode.

Such a condition is shown in FIG. 1(d), in which the solenoid lever 7 is caught by the first projection piece 7a at the third catch projection 12c of the upper cam 12 formed on the cam gear 4.

In the foregoing operation, turning of the selection lever 18 upon selection of reverse play and reverse record modes is regulated in the same way as when the play and record are selected modes. The force opposite the direction in which the tape is moving, is regulated by preventing the selection lever from being turned in clockwise direction.

The regulation of turning on the selection lever 18 is continued until completion of stop mode on selection of stop mode again in play and record mode conditions or reverse play and reverse record mode conditions. This prevents the tape from excessive transfer during the time period starting at the selection of stop mode and lasting until the motor is completely stopped, because the motor, being unable to stop immediately even after the selection of stop mode, runs more for a certain number of revolutions until the motor comes to a complete stop.

When stop mode is selected again after change over to play, record, reverse play, and reverse record modes as has been explained, all the operations are stopped after coming to a condition shown in FIG. 1(a).

This conventional mode change over device has problems in that the power consumption is increased due to over load of the motor coming from the rotation of gears and shortened life of the device, since, in case of selection of modes of play, record, reverse play, and reverse record in stop condition, the selection gear, hinged on the low end of the selection lever for transmitting power to make FF/REW available, is always receiving rotational force from the main gear.

SUMMARY OF THE INVENTION

The object of this invention devised for solving the foregoing problems is to provide a device for changing over of modes of a cassette tape recorder, which can reduce power consumption and can extend life of the device by preventing over load of the motor in play, record, reverse play, and reverse record modes by making the selection gear disengage from the main gear on selection of modes of play, record, reverse play, and reverse record while the selection gear has engaged with the main gear in stop condition, as well as reduction of noise by preventing play of the selection lever at the time of completion of mode selection.

These and other objects and features of this invention can be achieved by providing a device for changing over of modes of a cassette tape recorder including, reel gears and a main gear each rotatably fixed on a main plate with shaft, a selection lever for turning selectively toward the direction of rotation of the main gear, a selection gear mounted on one end of the selection lever and selectively engaged with the main gear for transmitting rotating force required for reeling tape reels to the reel gears, a cam gear rotating a certain amount every time a record changes over mode, a pinch gear for transmitting rotating force of the main gear to the cam gear, a transmission lever hinged on the same shaft with the pinch gear, a solenoid lever for initial rotation of the cam gear on selection of play and record modes and, a selection lever sliding means for disengaging the selection gear from the main gear by making the selection lever move downward at idling of the selection gear.

BRIEF DESCRIPTION OF THE DRAWINGS

FIGS. 1a–1d are plan views of a conventional device for changing over of modes of a cassette tape recorder, wherein:

FIGS. 2a–2d are plan views of a device for changing over modes of a cassette tape recorder in accordance with one aspect of the present invention, wherein:

FIGS. 3a and 3b are enlarged views of principal parts in accordance with this invention showing positions of the selection gear when stop mode has been selected in FF/REW conditions, wherein.

DETAILED DESCRIPTION OF THE INVENTION

This invention is to be explained in detail hereinafter, referring to the attached drawings of FIGS. 2a–3b shown as one embodiment of this invention.

Figure 2A:
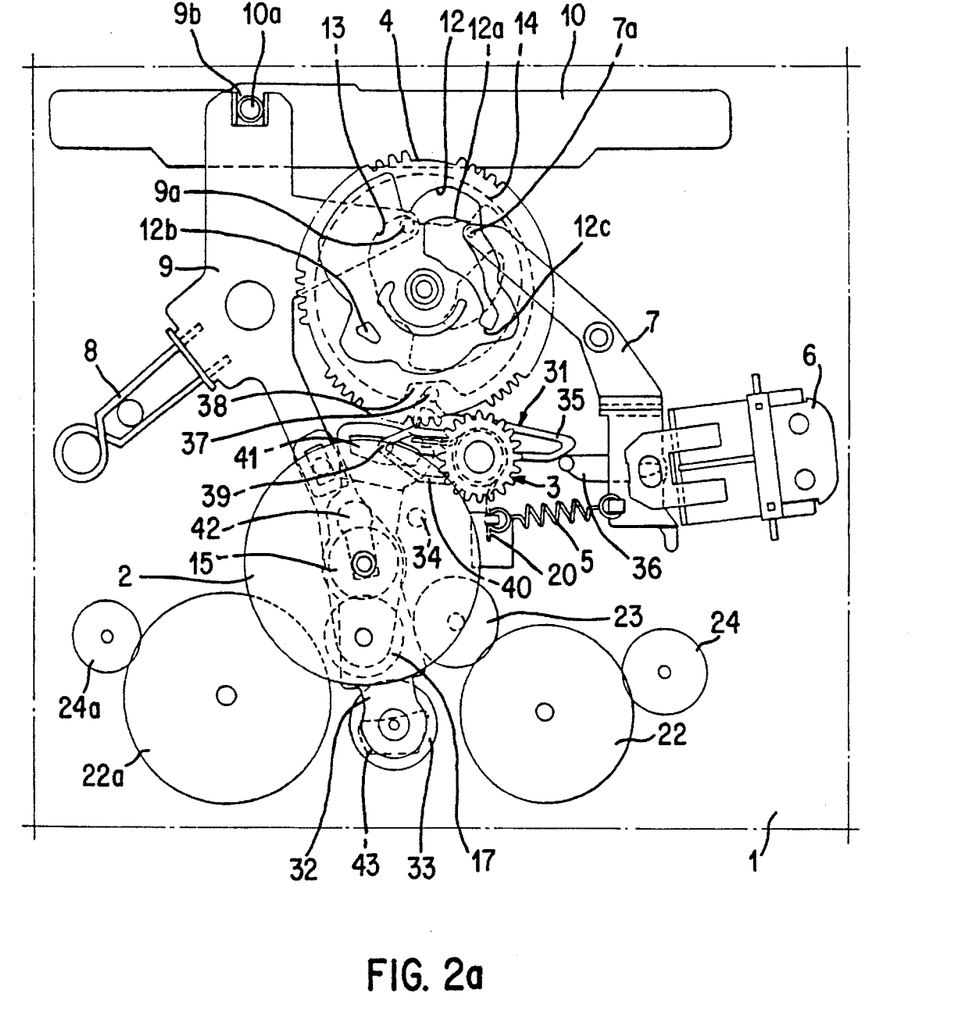
FIG. 2a shows a stop condition in which selection of FF/REW modes are available.
Figure 2B:
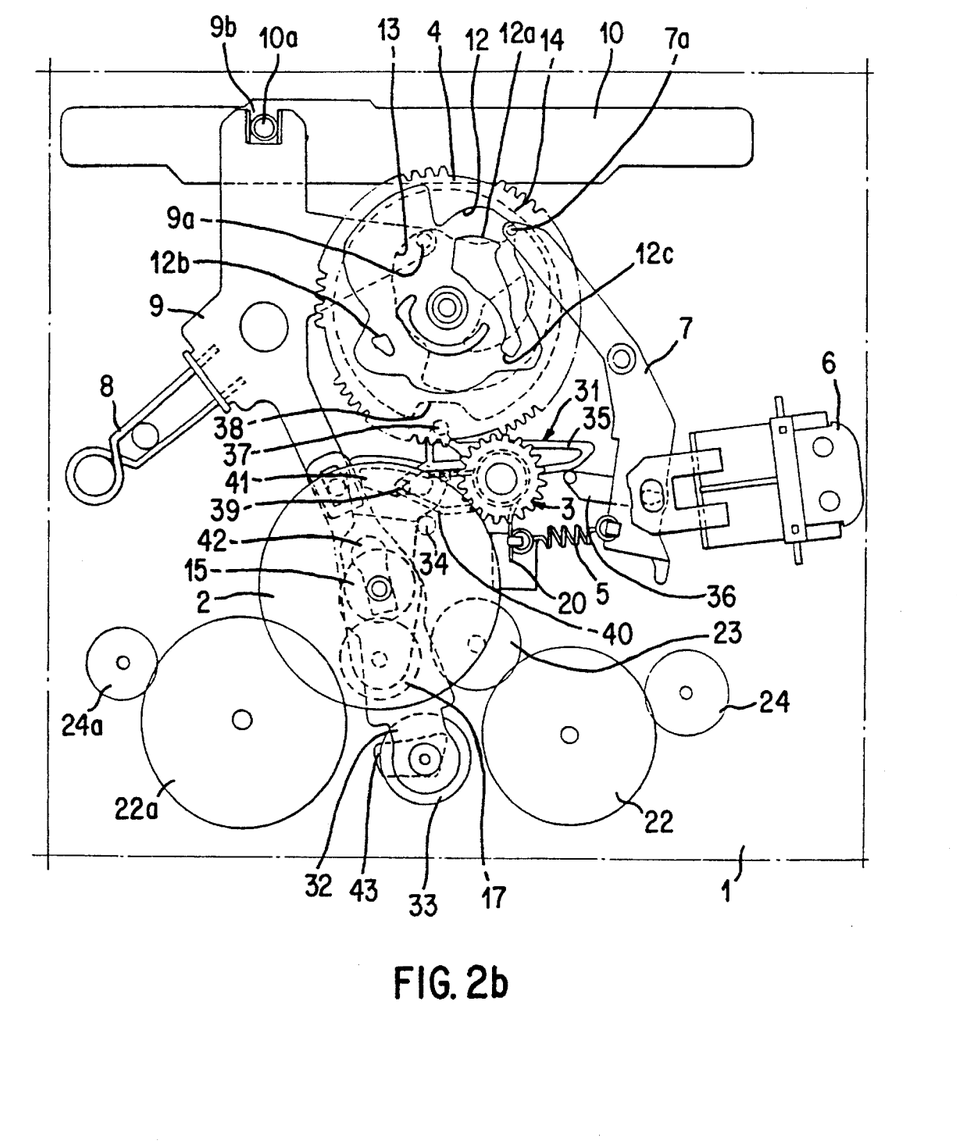
FIG. 2b shows an initial engagement condition of a cam gear with a pinch gear where play, record, reverse play, or reverse record mode has been selected.
Figure 2C:
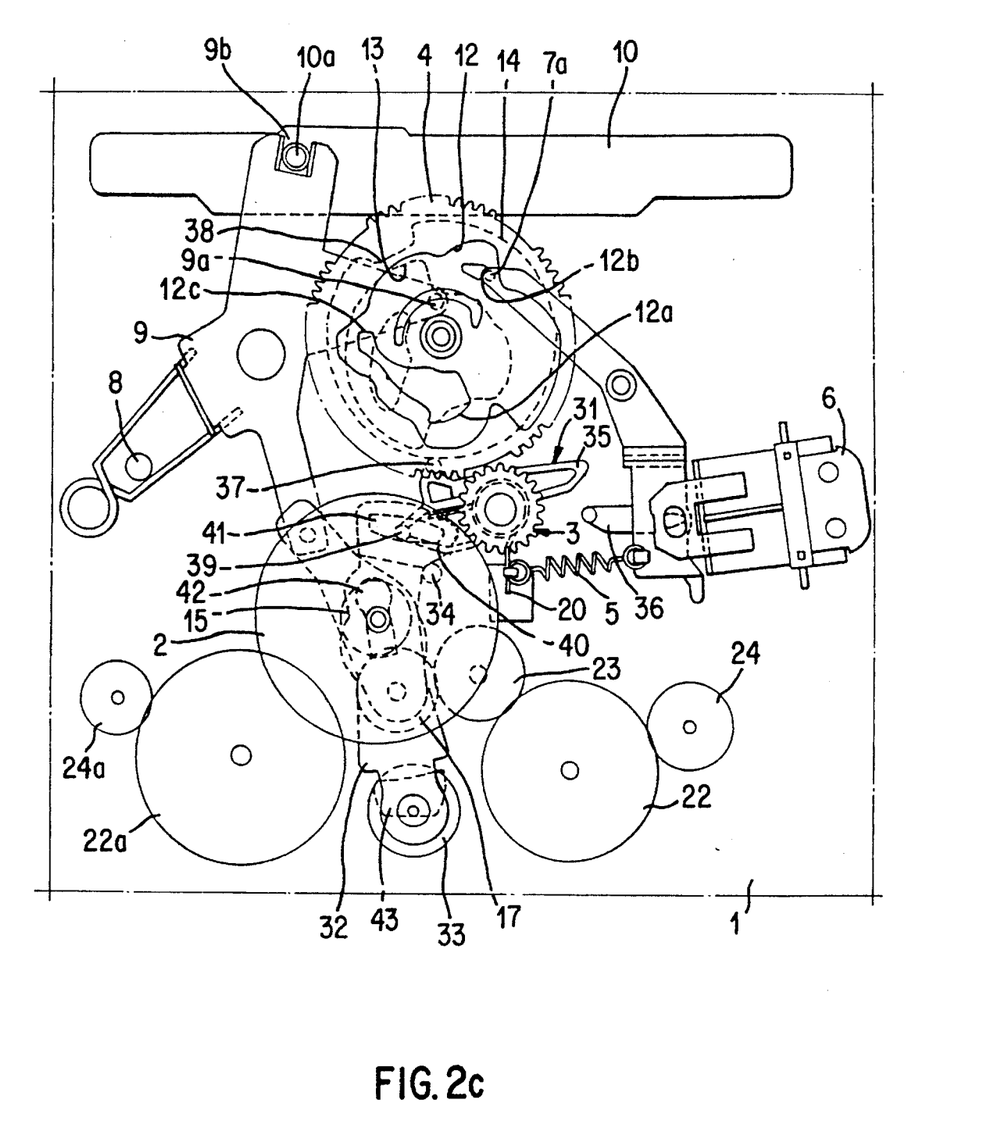
FIG. 2c shows a condition where play or record mode has been selected.
Figure 2D:
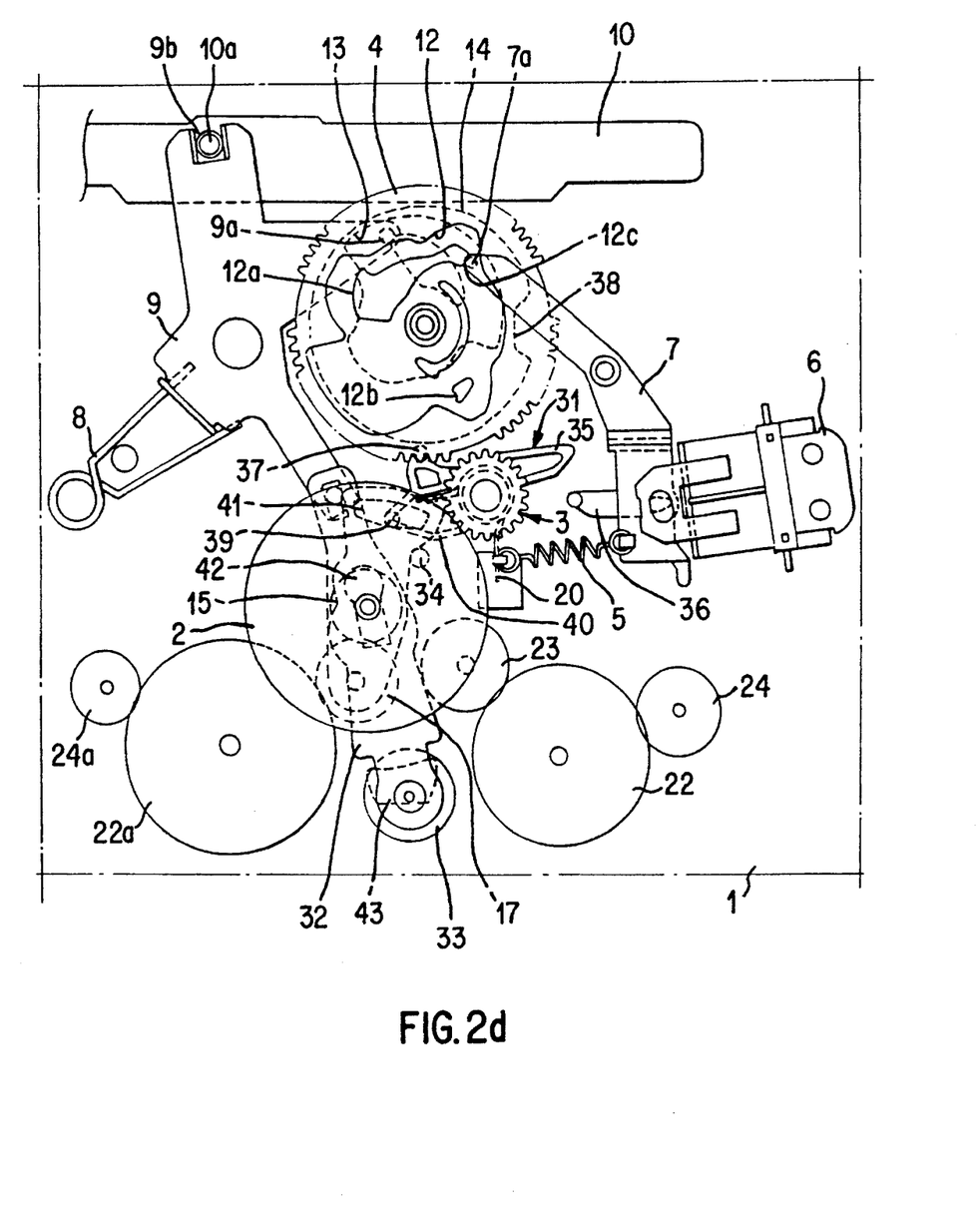
FIG. 2d shows a condition where reverse play or reverse record mode has been selected.
Figure 3A:
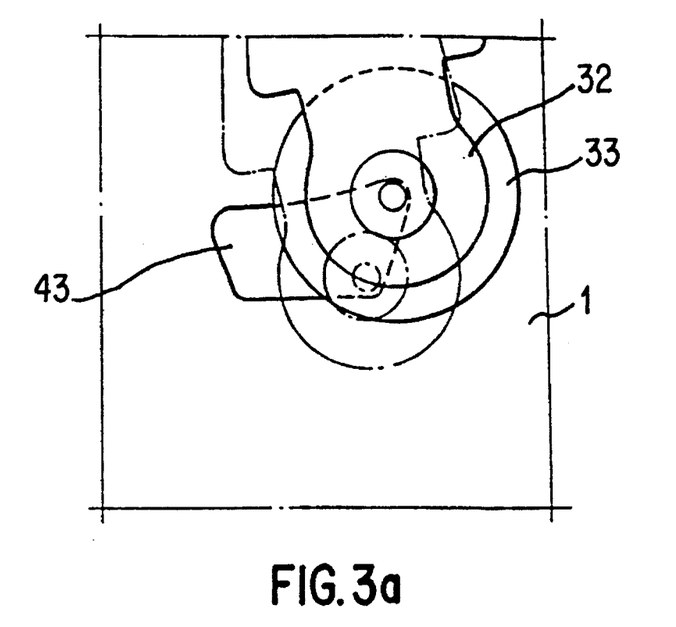
FIG. 3a shows the positions of the parts when stop mode has been selected from FF condition.
Figure 3B:
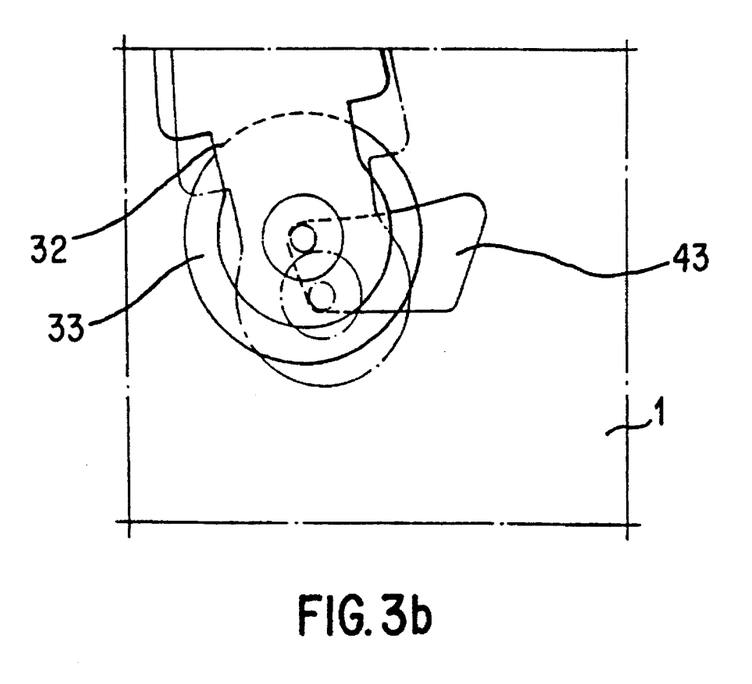
FIG. 3b shows the positions of the parts when stop mode has been selected from REW condition.

The attached drawings of FIGS. 2a–2d are plan views of a device for changing modes of a cassette tape recorder in accordance with this invention, and FIGS. 3a and 3b are enlarged views of principal parts in accordance with this invention showing positions of the selection gear when stop mode has been selected in FF/REW conditions, wherein explanations on parts having the same system with the conventional one have been omitted and simply shown with reference numbers identical to the conventional ones in the drawings.

The principal part of this invention includes a transmission lever 31 fixed on the shaft of a pinch gear 3 for being primarily rotated on receiving the rotating force of a solenoid lever 7 and for being secondarily rotated on receiving the rotating forge of a cam gear 4 at the time of selection of modes of play, record, reverse play, and reverse record. A selection lever 32 movably fixed on the shaft of the main gear 2 is movable in the up and down direction for being moved downward upon receipt of the primary and the secondary rotating force of the transmission lever 31 to disengage the selection gear 33 movably fixed on the selection lever 32 from the main gear 2. And, a stopper 34 is fixed on the main plate i for stopping further downward movement of the selection lever 32 at the time of selection of modes of play, record, reverse play, and reverse record.

The primary rotation of the transmission lever 31 is made available by providing a first transmission lever side projection piece 35 on the transmission lever 31 and a solenoid lever projection piece 36 on the solenoid lever 7, thereby making the solenoid lever projection piece 36 push the first transmission lever side projection piece 35 when the solenoid lever 7 is turned at the time of selection modes of play, record, reverse play, and reverse record.

The secondary rotation of the transmission lever 31 is made available by providing a contact projection 37 on the transmission lever 31 and a recess 38 on an outer low cam 14 of the cam gear 4, thereby making the contact projection 37 come out of the recess 38 and be guided by the outer low cam 14 when the cam gear 4 is rotated at the time of selection of modes of play, record, reverse play, and reverse record.

The selection lever 32 is made to move downward guided by a guide long hole 42 at the time of the primary and the secondary rotation of the transmission lever 31 by providing a second transmission lever projection piece 40 having a projection 39 at the end of the transmission lever 31, a long hole 41 in the upper part of the selection lever 32, and the guide long hole 42 in the center part of the selection lever 32 for inserting the shaft of the main gear 2 therein.

On the other hand, a trapezoidal guide cam 43 having a wider upper side is provided in the main plate 1 so that the hinge shaft of the selection gear 33 (hinged on the selection lever 32) is moved downward together with the selection lever guided by the guide cam 43 when the selection lever is moving downward due to receipt of the primary and the secondary rotation force of the transmission lever 31, and the selection gear is prevented from interfering with the first and the second intermediate gears 22 and 22a.

The operation of this invention having the foregoing system will now be explained, but only the operation of the principal parts of this invention will be explained and explanation of the operation of the parts which duplicate a conventional system will be omitted.

In the stop condition shown in FIG. 2, the solenoid 6 does not rotate the solenoid lever 7, the transmission lever 32 hinged on the same shaft with the pinch gear 3 also does not rotate, and the selection lever 32 (movably fixed on the hinge shaft of the main gear 2 movable in up and down direction) has been moved up to upper side. The end of the contact projection 37 on the transmission lever 31 is inserted in the recess 38 in the outer lower cam 14 of the cam gear 4 and the selection gear 33 (rotatably hinged on the low end of the selection lever 32) is engaged with the main gear 2.

In this condition, when a user has selected FF/REW modes, the main gear 2 rotates either in normal or reverse direction according to the selected mode and the selection lever 32 turns either in normal or reverse direction according to the direction of the rotating force centered on shaft of the main gear 2. The selection gear 33 disposed on the selection lever 32 is engaged either with the first intermediate gear 22 or with the second intermediate gear 22a enabling the FF/REW modes.

In the foregoing operation, since the end projection 39 of the transmission lever second projection piece 40 has been inserted into the long hole 41 on the upper part of the selection lever 32, the selection lever 32 is guided by the projection 39 when the selection lever 32 is turned either in normal or reverse direction.

On the other hand, when the device is in the stop condition and a user has selected play, record, reverse play, or reverse record mode, power is applied to the solenoid 6 mounted on the main plate 1 causing it to lose magnetic force. The solenoid lever 7 is turned in a clockwise direction by the recovering force of the spring 5. The solenoid lever projection piece 36 on the solenoid lever 7 pushes the first transmission lever side projection piece 35, and the transmission lever 31 is rotated in counter clockwise direction facing the paper. Accordingly, since the projection 39 at the end of the second side projection piece 40 of the transmission lever 31 is inserted in the long hole 41 in the upper end of the selection lever 32, it pushes the selection lever 32 downward a little no sooner than the end of the contact projection 37 on the transmission lever comes out of the recess 38 in the outer low cam 14 on the cam gear 4. The selection gear 33, hinged on the low end of the selection lever 32, is disengaged from the main gear 2 since the selection lever 32 is moved downward by a distance proportional to the amount of the primary rotation of the transmission lever 31 and is guided by the hinge shaft thereof.

This condition is shown in FIG. 2B which is a condition that the solenoid lever 7 has turned in clockwise direction facing the paper by the solenoid 6 to make the cam gear 4 engaged with the pinch gear 3.

Continuing the foregoing operation, the rotation force of the main gear 2 is transmitted to the cam gear 4, rotating the cam gear 4 in clockwise direction. This allows mode of play, record, reverse play, or reverse record to be carried out according to which mode was selected, because the contact projection 37 on the transmission lever 31 has completely come out of the recess 38 in the outer low can 14 of the cam gear 4 and is guided by the outer low cam 14. The transmission lever 31, having completed the primary rotation, carries out the secondary rotation. Since the selection lever 32 has completely moved down (guided by the shaft of the main gear 2 by the projection 39 at the end of the second projection piece of the transmission lever 31) the selection gear 33 on the low end of the selection lever 32 from the main gear 2 is completely disengaged, and the rotation force of the main gear 2 can not be transmitted to the selection gear 33.

In the foregoing operation, the long guide hole 42 in the center of the selection lever 32 allows the selection lever to be guided by the shaft of the main gear 2 when the selection lever 32 is moved downward.

When stop mode is selected from FF mode, as shown in FIG. 3a, the shaft of the selection gear 33 (on the low end of the selection lever 32) makes contact with the trapezoidal guide cam 43 in the main plate 1 at the right upper side thereof and the selection gear 33 is engaged with both the main gear 2 and the first intermediate gear 22. When stop mode is selected in REW mode as shown in FIG. 3b, the shaft of the selection gear 33 (on the low end of the selection lever 32) makes contact with the trapezoidal guide cam 43 in the main plate 1 at the left upper side thereof and the selection gear 32 is engaged with both the main gear 2 and the second intermediate gear 22a. When play, record, reverse play, or reverse record mode is selected in the foregoing conditions, the hinge shaft of the selection gear 33 is guided by the trapezoidal guide cam 43 when the selection lever is moved downward. The hinge shaft of the selection gear 33 rests in contact with the guide cam 43 at the right low part thereof or left low part thereof and the upper part of the one side of the selection lever 32 rests in contact with the stopper 34 on the main plate 1. After the selection lever 32 has completed downward movement, even though the body of the cassette tape recorder is shaken hard during operation (play, record, reverse play, or reverse record) the selection lever 32 does not move. This prevents the selection lever 32 from contacting the first intermediate gear 22 or the second intermediate gear 22a, and it makes possible to reduce the amount of noise generated during selection of modes.

In the foregoing operation, when play, record, reverse play, or reverse record mode is carried out, the hinge shaft of the selection gear 33 is in contact with the guide cam 43 at either the right lower part thereof as shown in FIG. 3a or the left lower part thereof as shown in FIG. 3b. This prevents the selection gear 33 from making any contact with the rotating first intermediate gear 22 or the rotating second intermediate gear 22a even though the cassette tape recorder is shaken hard because the guide cam 42 guiding the hinge shaft of the selection gear 33 at the time of the downward movement of the selection lever 32 has a trapezoidal form with a wider upper side.

FIG. 2c shows a condition where the change to play or record mode is completed (after play or record mode has been selected) and FIG. 2d shows a condition where the change to reverse play or reverse record mode is completed (after reverse play or reverse record mode has been selected). Detailed explanations are omitted herein since those are considered understandable with reference to the previous explanations of the conventional system.

Thus, the present invention has various advantages, such as reduced power consumption and reduced noise. The selection gear, hinged on the selection lever, is disengaged from the main gear during selection of play, record, reverse play, or reverse record mode while the selection gear has been engaged with the main gear in stop condition, which prevents movement of the selection lever, unnecessary rotation of the selection gear, and accordingly prevents the motor driving the main gear from being overloaded.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A device for changing modes of a cassette tape recorder, comprising:

reel gears and a main gear, each rotatably disposed on a main plate;

a selection lever rotatably disposed on said main plate;

a selection gear mounted on one end of said selection lever, said selection gear being capable of selectively engaging said main gear upon rotation of said selection lever, and enabling rotational force to be transmitted to one of said reel gears;

a cam gear rotatably disposed on said main plate;

a pinch gear rotatably disposed on a shaft attached to said main plate, and said pinch gear being capable of transmitting rotating force from said main gear to said cam gear;

a transmission lever disposed on said pinch gear shaft;

a solenoid lever rotatably disposed on said main plate and capable of imparting rotational force to said cam gear upon selection of one of play and record modes; and a disengagement means slidably disposed above said main plate, for disengaging said selection gear from said main gear by causing said selection lever to move downward in a direction away from the cam gear when said selection gear is not rotating.

2. The device as claimed in claim 1, further comprising a stopper formed on the main plate for preventing movement of the two reel gears by contacting the upper part of one side of the selection lever moved downward by the disengagement lever.

3. The device as claimed in claim 1, wherein the disengagement means comprises, a solenoid projection piece for selective primary rotation of the transmission lever, a projection which is formed at one end of said transmission lever and capable of transmitting force to said selection lever and causing it to move downward to a lower position or upward to an upper position; and said selection lever has an elongated hole formed therein, into which a shaft of said main gear is disposed, such that said main gear shaft guides sliding movement of said selection lever.

4. The device as claimed in claim 2, wherein the transmission lever has a contact projection adapted to contact said cam gear, enabling secondary rotation for completely cutting off the rotational force of the transmission lever after rotation of the cam gear.

5. The device as claimed in claim 2, wherein a rotation shaft of said selection gear is guided by a guide cam formed in the main plate when the selection lever is moved downward by the rotation force of the transmission lever.

6. The device as claimed in claim 5, wherein the guide cam is in the form of a trapezoid with a wider upper side so that said selection gear is prevented from interfering with other gears when the selection lever is in the lower position.

* * * * *